(12) United States Patent
Higuchi et al.

(10) Patent No.: US 6,404,016 B1
(45) Date of Patent: Jun. 11, 2002

(54) SEMICONDUCTOR DEVICE

(75) Inventors: Fukuji Higuchi; Mitsuo Mori, both of Gunma (JP)

(73) Assignee: Sanyo Electric Co. Ltd., Osaka (JP)

( * ) Notice: Subject to any disclaimer, the term of this patent is extended or adjusted under 35 U.S.C. 154(b) by 0 days.

(21) Appl. No.: 09/520,547

(22) Filed: Mar. 8, 2000

(30) Foreign Application Priority Data

May 21, 1999 (JP) .......................................... 11-141950

(51) Int. Cl.[7] .............................................. H01L 23/62
(52) U.S. Cl. ...................... 257/355; 257/350; 257/356; 257/360; 327/310
(58) Field of Search ................................ 257/350, 355, 257/356, 360; 327/310

(56) References Cited

U.S. PATENT DOCUMENTS 5,886,558 A * 3/1999 Iijima et al. ................. 327/310

FOREIGN PATENT DOCUMENTS

JP        9 172146     *  6/1997

* cited by examiner

Primary Examiner—Nathan Flynn
Assistant Examiner—Ahmed N. Sefer
(74) Attorney, Agent, or Firm—Fish & Richardson P.C.

(57) ABSTRACT

In a semiconductor device in which an analog section to which power source lines Vdd1 and Vss1 are supplied and a digital section to which power source lines Vdd2 and Vss2 are supplied are mounted in an N-type semiconductor substrate and connected to each other by a signal line S11, a protection circuit HK1 is located between the power source line Vdd1 and Vdd2, the protection circuit becoming conductive when a potential difference between the power source lines Vdd1 and Vdd2 exceeds a prescribed value irrespectively of the direction of a surge input, thereby placing the power source lines Vdd1 and Vdd2 at substantially the same potential.

4 Claims, 3 Drawing Sheets

SEMICONDUCTOR DEVICE

BACKGROUND OF THE INVENTION

The present invention relates to a semiconductor device, and more particularly to a protection circuit for electrostatic breakdown (it may be called as electrostatic discharge "ESD") in the semiconductor device including two or more kinds of power source systems in a single unit.

Now referring to the drawings, an explanation will be given of a semiconductor device according to a prior art. Many semiconductor devices, represented by a device incorporating a digital section and an analog section in the single unit, have two or more individual power source systems, which may be set at equal voltages.

An example of such a semiconductor device is shown in FIG. 3. As seen from FIG. 3, this device includes first circuitry which is an analog section composed of an analog circuit 1, an output circuit 3 and an input protection circuit 5, and second circuitry which is a digital section composed of a digital circuit 2 and an input circuit 4. Both sections are connected to each other by a signal line S1.

A power source voltage for the analog section is supplied from power source lines Vdd1 and Vss1, whereas a power source voltage for the digital section is supplied from power source lines Vdd2 and Vss2. The power source lines Vdd1 and Vdd2 are separated from each other, and the power source lines Vss1 and Vss2 are also separated from each other.

In the above device, an output signal is produced from the analog circuit 1 through the output circuit. The output signal is transferred to the digital circuit 2 of the digital section through the signal line S1. Specifically, the output signal is supplied to the input circuit 4 made of an inverter.

Because of any cause, where a surge input is supplied from an applying terminal NT which is an input terminal to the analog section, a rushing current SR occurs along the passage as shown in FIG. 3 so that the potential at the power source line Vss1 rises. Correspondingly, the potential in the signal line S1 also rises. This applies to the case where the surge input is supplied from the power source line Vss1.

In this case, the following problem occurs. The gate potential of a MOS transistor Q1 constituting an inverter of the input circuit 4 rises excessively so that the gate-source voltage of the MOS transistor Q1 increases excessively. As a result, the gate oxide film of the MOS transistor Q1 will be broken.

In order to prevent such electrostatic breakdown in the above circuit configuration, i.e. a semiconductor device in which a multiple power system having two or more kinds of power sources and first circuitry and second circuitry are contained therein and the first circuitry and the second circuitry are connected by a signal line, it is proposed to place a protection circuit (e.g. MOS transistor) between the first power source line Vss1 and the second power source line Vss2. In such a proposed circuit configuration, when the potential difference between the first power source line Vss1 and the second power source line Vss2 exceeds a prescribed value, the protection circuit becomes conductive so that both power source lines are made the same potential, thereby preventing occurrence of the electrostatic breakdown in the MOS transistor Q1.

However, in the above device configuration, the direction of the MOS transistor is determined based on which of the first power source line Vss1 and second source line Vss2 is larger or smaller than the other is determined. In a case where the direction of the MOS transistor is incorrectly set, the first power source line Vss1 and second power source line Vss2 are short-circuited to each other even if the protection circuit is provided.

SUMMARY OF THE INVENTION

An object of the present invention is to provide a semiconductor device capable of protecting electrostatic breakdown when a surge input occurs irrespectively of the magnitude relationship between the first power source line and second power source line.

According to the invention, a semiconductor device includes an N-type semiconductor substrate on which an analog section to which power source lines Vdd1 and Vss1 are supplied and a digital section to which power source lines Vdd2 and Vss2 are supplied. The analog section and the digital section are mounted and connected to each other by a signal line S11. The device also has a protection circuit HK1 located between the power source line Vss1 and Vss2. The protection circuit becomes conductive when a potential difference between the power source lines Vss1 and Vss2 exceeds a prescribed value irrespectively of the direction of the a surge input. Therefore, the power source lines Vss1 and Vss2 are placed at substantially the same potential.

DETAILED DESCRIPTION OF THE PREFERRED EMBODIMENTS

Figure 1A:
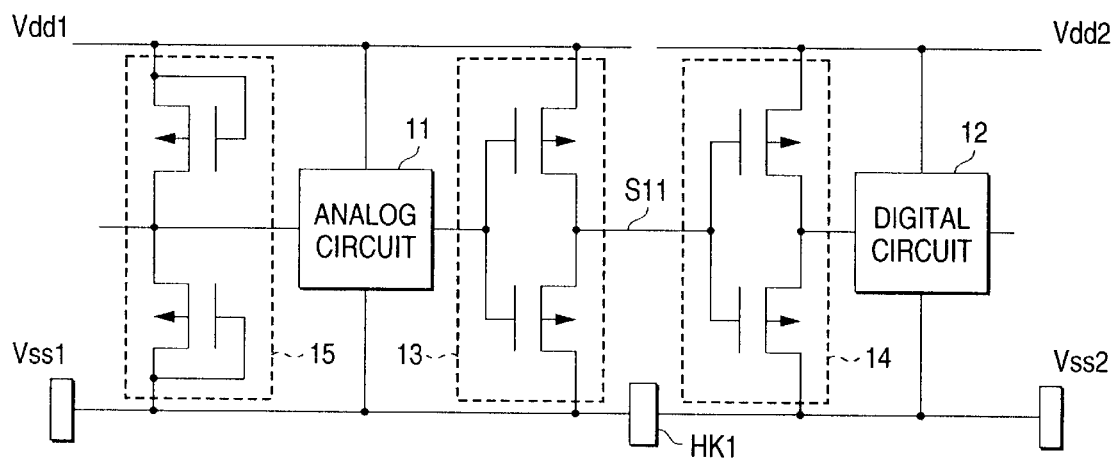
FIGS. 1A and 1B are circuit diagrams showing a semiconductor device according to an embodiment of the invention.

Now referring to the drawings, an explanation will be given of an embodiment of a semiconductor device according to the invention. Incidentally, in the semiconductor device according to this embodiment, it should be noted that an analog section and a digital section are mounted in a single device such as a semiconductor memory.

First Embodiment

Figure 1B:
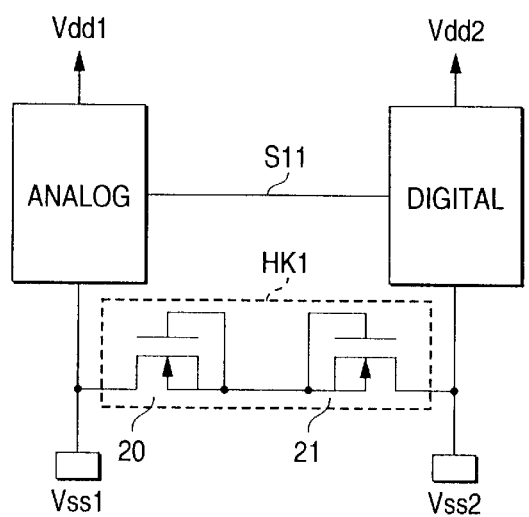

FIG. 1 shows an embodiment of a semiconductor device according to the invention which is formed in an N-type semiconductor substrate. The semiconductor device includes first circuitry which is an analog section composed of an analog circuit 11, an output circuit 13 and an input protection circuit 15 and a second circuitry which is a digital section composed of a digital circuit 12 and an input circuit 14. Both sections are connected to each other by a signal line S11.

A power source voltage for the analog section is supplied from power source lines Vdd1 and Vss1, whereas a power source voltage for the digital section is supplied from power source lines Vdd2 and Vss2. The power source lines Vdd1 and Vdd2 are separated from each other, and the power source lines Vss1 and Vss2 are connected to each other through a protection circuit HK1.

Incidentally, the analog section is an example of the first circuitry, and the digital section is an example of the second circuitry. Further, the power source line Vdd1 is an example of the power source line on the first high potential side and the power source line Vss1 is an example of the power, source line on the first low potential side. Further, the power source line Vdd2 is an example of the power source line on the second high potential side and the power source line Vss1 is an example of the power source line on the second low potential side.

Therefore, for example, the first circuitry may be a digital circuit whereas the second circuitry may be an analog circuit. Otherwise, both first and second circuits may be the analog circuit or the digital circuit.

The analog circuit may be a DC converter for a video tape recorder, an amplifier therefor, or a counter-electrode amplifier. The digital amplifier may be a timing controller or data selector. Further, Vdd1 supplied to the analog section is used within a range of 5.5 V–2.7 V and Vdd 2 supplied to the digital section is used within a range of 5.5 V–4.5 V.

The protection circuit HK1 is a switching circuit which becomes conductive when the potential difference between the power source line Vss1 and power source line Vss2 exceeds a prescribed value (when it is applied between the source and drain, an avalanche breakdown occurs), thereby placing the power source lines Vss1 and source lines Vss2 forcibly at substantially the same potential.

According to the present invention, the protection circuit HK1 is inserted between the power source line Vss1 and power source Vss2. The protection circuit HK1 is arranged to operate properly even when the surge input which is a cause of electrostatic breakdown is supplied from either direction (for example, from the analog circuit side to the digital circuit side, or from the digital circuit side to the analog circuit side).

Specifically, an N-channel MOS transistor 20 serving as the first protection circuit and another N-channel MOS transistor 21 serving as the second protection circuit are connected in series in their oriented form so that the former falls in an avalanche breakdown when a surge input is applied where Vss1>Vss2 and the latter falls in the avalanche breakdown when the surge input is applied where Vss1<Vss2.

In the N-channel MOS transistor 20, its drain electrode is connected to the power source line Vss1, its source electrode is connected to the source electrode of the other N-channel MOS transistor 21, and its gate electrode is connected to the drain electrode. In the N-channel MOS transistor 21, its drain electrode is connected to the power source line Vss2, and its gate electrode is connected to the drain electrode.

According to the above configuration, when a surge input is applied where Vss1>Vss2, the N-channel MOS transistor 20 serving as the first protection circuit falls in an avalanche breakdown so that the source and the drain of the MOS transistor 20 are made at same potential. At the same time, the gate potential of the MOS transistor 21 is rised to made the MOS transistor 21 ON-state. Thus, the power source lines Vss1 and Vss2 are made at same potential. Alternatively, in a case of where a surge input is applied where Vss1<Vss2, the power source lines Vss1 and Vss2 are also made at same potential as same manner.

The invention should not be limited to such a configuration. For example, between the power source lines Vss1 and Vss2, N-channel MOS transistors connected in series may be located which are oriented, respectively, as described above and produces punch-through when the surge input is applied, thereby forcibly placing the power source lines Vss1 and Vss2 at the same potential.

Further, the protection circuit should not be limited to the MOS transistor, but may be a diode which is oriented as described above.

Second Embodiment

Referring to the drawing, an explanation will be given of another embodiment of the invention. Incidentally, like reference numerals refer to like elements in the above embodiment.

Figure 2A:
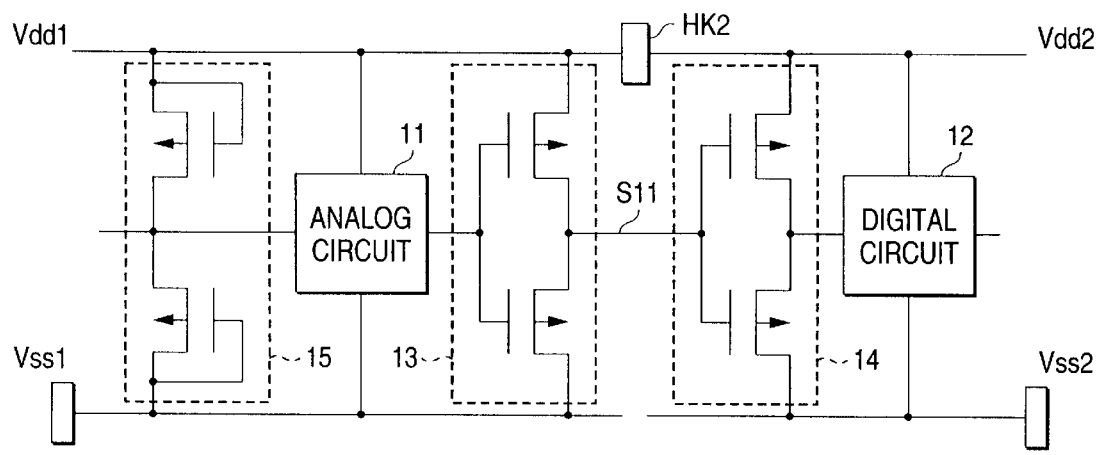
FIGS. 2A and 2B are circuit diagrams showing a semiconductor device according to another embodiment of the invention.
Figure 2B:
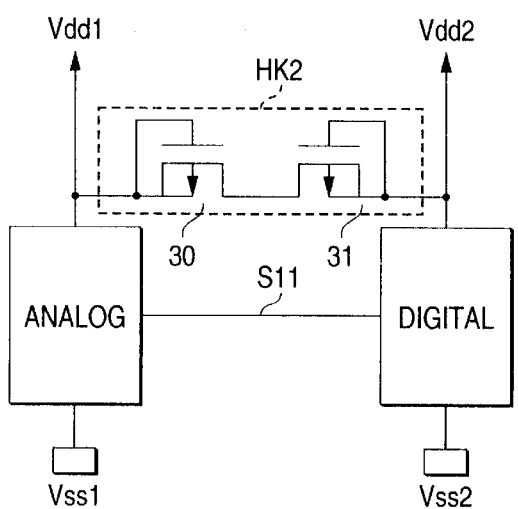
Figure 3:
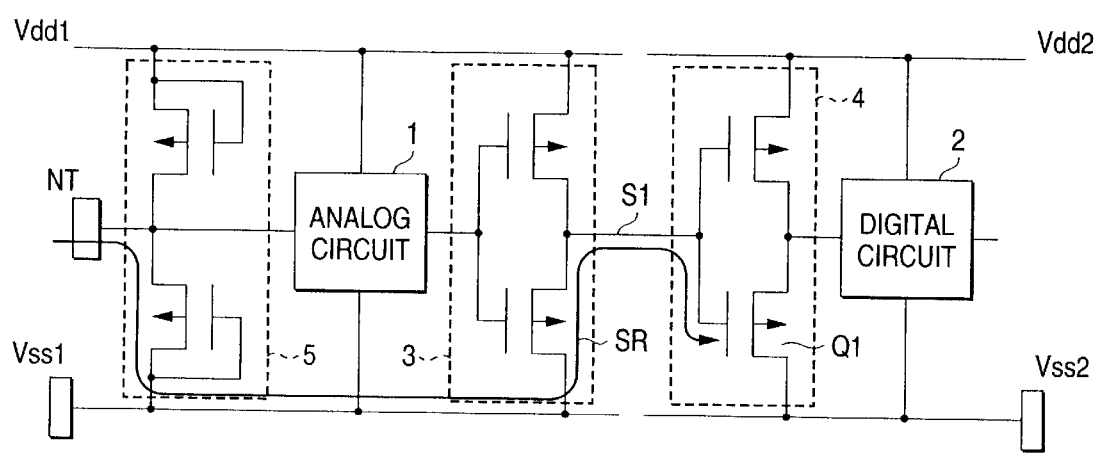
FIG. 3 is a circuit diagram showing a conventional semiconductor device.

FIG. 2 shows another embodiment in which the semiconductor device according to the invention is formed on a P-type semiconductor substrate. The semiconductor device includes a first circuitry which is an analog section composed of an analog circuit 11, an output circuit 13 and an input protection circuit 15 and a second circuitry which is a digital section composed of a digital circuit 12 and an input circuit 14. Both sections are connected to each other by a signal line S11.

A power source voltage for the analog section is supplied from power source lines Vdd1 and Vss1, whereas a power source voltage for the digital section is supplied from power source lines Vss1 and Vss2. The power source lines Vdd1 and Vdd2 are separated from each other. and the power source lines Vdd1 and Vdd2 are connected to each other through a protection circuit HK2.

The protection circuit HK2 is a switching circuit which becomes conductive when the potential difference between the power source line Vss1 and power source line Vss2 exceeds a prescribed value (when it is applied between the source and drain, an avalanche breakdown occurs) to place the power source lines Vss1 and source lines Vss2 forcibly at substantially the same potential.

The protection circuit HK2 is arranged to operate properly even when the surge input which is a cause of electrostatic breakdown is supplied from either direction (for example, from the analog circuit side to the digital circuit side, or from the digital circuit side to the analog circuit side).

Specifically, an P-channel MOS transistor 30 serving as the first protection circuit and another N-channel MOS transistor 21 serving as the second protection circuit are connected in series in their oriented form so that the former falls in an avalanche breakdown when a surge input is applied where Vdd1>Vdd2 and the latter falls in the avalanche breakdown when the surge input is applied where Vdd1<Vdd2.

In the P-channel MOS transistor 30, its source electrode is connected to the power source line Vdd1, its drain electrode is connected to the source electrode of the other P-channel MOS transistor 31, and its gate electrode is connected to the source electrode. In the N-channel MOS transistor 31, its source electrode is connected to the power source line Vdd2, and its gate electrode is connected to the source electrode.

The invention should not be limited to such a configuration. For example, between the power source lines Vdd1 and Vdd2, P-channel MOS transistors connected in series may be located which are oriented, respectively, as described above and produces punch-through when the surge input is applied, thereby forcibly placing the power source lines Vdd1 and Vdd2 at the same potential. Further, the protection circuit should not be limited to the MOS transistor, but may be a diode which is oriented as described above.

As described above, in accordance with the invention, in a semiconductor device in which a multiple power system having two or more kinds of power sources and first circuitry and second circuitry are contained in a single unit and the first circuit and the second circuit are connected by a signal line, a protection circuit HK1 (N-channel MOS transistor) is placed between a first power source line Vss1 and a second power source line Vss2, otherwise another protection circuit HK2 (P-channel MOS transistor) is placed between the first power source line Vdd1 and the second power source line Vdd2. In such a proposed circuit configuration, when the potential difference between the first power source line Vss1 or Vdd1 and the second power source line Vss2 or Vdd2 exceeds a prescribed value, the protection circuit becomes conductive so that both power source lines are made at the same potential, thereby preventing a MOS transistor of an input circuit of the second circuit from occurring the electrostatic breakdown.

In accordance with the invention, in a semiconductor device in which a multiple power system having two or more kinds of power sources and first circuitry and second circuitry are contained in a single unit and the first circuitry and the second circuitry are connected by a signal line, a protection circuit is placed between a first power source line and a second power source line. In such a proposed circuit configuration, when the potential difference between the first power source line and the second power source line exceeds a prescribed value, the protection circuit becomes conductive so that both power source lines are located at the same potential, thereby preventing the electrostatic breakdown in the MOS transistor. In addition, because the protection circuit includes two directional elements which are serially connected each other in reversal polarity, protection against electrostatic breakdown can be assured when a surge input occurs from either direction irrespectively of the magnitude relationship between the first power source line and second power source line.

What is claimed is:

1. A semiconductor device comprising:
   a first circuitry;
   a second circuitry;
   a first power source including a first low potential side power source line and a first high potential side power source line for supplying a first power source voltage to said first circuitry;
   a second power source including a second low potential side power source line and a second high potential side power source line for supplying a second power source voltage to said second circuitry;
   a signal line connected between said first circuitry and second circuitry for transferring a signal between said first circuitry and said second circuitry;
   a MOS transistor with a gate connected to said signal line, and a source or drain connected to said second low potential side power source line or said second high potential side power source line, said MOS transistor serving as an input circuit of the second circuitry; and
   a protection circuit disposed serially between said first low potential side power source line and said second low potential side power source line, said protection circuit comprising a first directional element which becomes conductive when a potential of said first low potential side power source line is larger than that of said second low potential side power source line by a prescribed value, and a second directional element which becomes conductive when a potential of said second low potential side power source line is larger than that of said first low potential side power source line by a prescribed value, said first directional element and said second directional element are serially connected in reverse direction with no branching point therebetween.

2. A semiconductor device according to claim 1, wherein said first directional element comprises a first MOS transistor which falls in an avalanche breakdown where the potential at said first low potential side power source line is higher by a prescribe potential difference than that at said second low potential side power source line; and
   said second directional element comprises a second MOS transistor which falls in the avalanche breakdown where the potential at said second low potential side power source line is higher by the prescribe potential difference than that at said first low potential side power source line, said second MOS transistor connected to said first MOS transistor in series.

3. A semiconductor device comprising:
   a first circuitry:
   a second circuitry;
   a first power source including a first low potential side power source line and a first high potential side power source line for supplying a first power source voltage to said first circuitry,
   a second power source including a second low potential side power source line and a second high potential side power source line for supplying a second power source voltage to said second circuitry;
   a signal line connected between said first circuitry and second circuitry for transferring a signal between said first circuitry and said second circuitry;
   a MOS transistor with a gate connected to said signal line, and a source or drain connected to said second low potential side power source line or said second high potential side power source line, said MOS transistor serving as an input circuit of the second circuitry; and
   a protection circuit disposed serially between said first high potential side power source line and said second high potential side power source line, said protection circuit comprising a first directional element which becomes conductive when a potential of said first high potential side power source line is larger than that of said second high potential side power source line by a prescribed value, and a second directional element which becomes conductive when a potential of said second high potential side power source line is larger than that of said first high potential side power source line by a prescribed value, said first directional element and said second directional element are serially connected in reverse direction with no branching point therebetween.

4. A semiconductor device according to claim 3, wherein said protection circuit comprises:
   a first MOS transistor which falls in an avalanche breakdown where the potential at said first high potential side power source line is higher by a prescribe potential difference than that at said second high potential side power source line; and
   a second MOS transistor which falls in the avalanche breakdown where the potential at said second high potential side power source line is higher by the prescribed potential difference than that at said first high potential side power source line, said second MOS transistor connected to said first MOS transistor in series.

* * * * *